(12) United States Patent
Sasaki (10) Patent No.: US 8,537,691 B2
(45) Date of Patent: Sep. 17, 2013

(54) PATH-CONTINUITY CHECK METHOD AND TRANSMISSION DEVICE

(75) Inventor: Takanori Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/926,367

(22) Filed: Nov. 12, 2010

(65) Prior Publication Data

US 2011/0149748 A1 Jun. 23, 2011

(30) Foreign Application Priority Data

Dec. 17, 2009 (JP) ................................. 2009-286797

(51) Int. Cl.
*G01R 31/08* (2006.01)
(52) U.S. Cl.
USPC .......................... 370/241.1; 370/242; 370/248
(58) Field of Classification Search
None
See application file for complete search history.

(56) References Cited

U.S. PATENT DOCUMENTS

| 2008/0219173 A1* | 9/2008 | Yoshida et al. | 370/241.1 |
| 2009/0196188 A1* | 8/2009 | Takeyoshi et al. | 370/242 |
| 2009/0213759 A1 | 8/2009 | Kitajima | |
| 2010/0110881 A1* | 5/2010 | Ryoo et al. | 370/225 |

FOREIGN PATENT DOCUMENTS

| JP | 2008-244689 | 10/2008 |
| WO | 2009/107198 A1 | 9/2009 |

* cited by examiner

*Primary Examiner* — Kevin C Harper
(74) *Attorney, Agent, or Firm* — Staas & Halsey LLP (57) ABSTRACT

Disclosed is a path-continuity check method for checking continuity of a path. The method includes transmitting a check frame by a node device on an upstream side and receiving the check frame by a node device on a downstream side; registering, by the node device on the upstream side, path information of the check frame and a transmission port in a transmission learning table together with a downstream learning number as a table number of a reception learning table of the node device on the downstream side in which the path information is registered; and setting, by the node device on the upstream side, plural of the downstream learning numbers registered in the transmission learning table in one aggregation check frame as table number ON information items and transmitting, by the node device on the upstream side, the one aggregation check frame to the node device on the downstream side.

11 Claims, 10 Drawing Sheets

| TABLE NUMBER | PORT ID | MAC-SA | MAC-DA | MEG-ID | MEP-ID | DOWNSTREAM LEARNING NUMBER |
|---|---|---|---|---|---|---|
| 1 | 8 | AA-BB-CC-DD-EE-FF | GG-HH-II-JJ-KK-LL | NTTxxxxxxxxxxxx | 1111 | 001 |
| 2 | | | | | | |
| 3 | | | | | | |
| 4 | | | | | | |

| TABLE NUMBER | PORT ID | MAC-SA | MAC-DA | MEG-ID | MEP-ID |
|---|---|---|---|---|---|
| 1 | 10 | AA-BB-CC-DD-EE-FF | GG-HH-II-JJ-KK-LL | NTTxxxxxxxxxx | 1111 |
| 2 | | | | | |
| 3 | | | | | |
| 4 | | | | | |

FIG.5

| TABLE NUMBER | PORT ID | MAC-SA | MAC-DA | MEG-ID | MEP-ID | DOWNSTREAM LEARNING NUMBER |
|---|---|---|---|---|---|---|
| 1 | 8 | AA-BB-CC-DD-EE-FF | GG-HH-II-JJ-KK-LL | NTTxxxxxxxxxx | 1111 | 001 |
| 2 | | | | | | |
| 3 | | | | | | |
| 4 | | | | | | |

| Offset | Field |
|---|---|
| 1 | DA (DESTINATION MAC ADDRESS) |
| 5 | |
| 9 | SA (SOURCE MAC ADDRESS) |
| 13 | EtherType(vlan) \| VLAN-ID |
| 17 | EtherType(Eth OAM) \| MLV \| Version \| OpCode CCM-ACK(12) |
| 21 | Flags \| TLV Offset \| all '0x00' |
| 25 | all '0x00' \| MEP ID |
| 29 | MEG ID |
| 33 | |
| 37 | |
| 41 | |
| 45 | |
| 49 | |
| 53 | |
| 57 | |
| 61 | |
| 65 | |
| 69 | |
| 73 | |
| 77 | TxFCf (all '0x00') |
| 81 | RxFCb (all '0x00') |
| 85 | TxFCb (all '0x00') |
| 89 | LEARNING TABLE NUMBER(1 TO 512: 0x000 TO 0x200) \| FCS |
| 93 | End TLV |
| 97 | FCS |

PATH-CONTINUITY CHECK METHOD AND TRANSMISSION DEVICE

CROSS-REFERENCE TO RELATED APPLICATION

This application is based upon and claims the benefit of priority of Japanese Patent Application No. 2009-286797, filed on Dec. 17, 2009, the entire contents of which are incorporated herein by reference.

FIELD

The embodiment discussed herein is related to a path-continuity check method for checking the continuity of a path and a node device.

BACKGROUND

Up until now, there have been discussed methods capable of generating network topology information using only information on a node connected to a network.
Patent Document 1: Japanese Laid-open Patent Publication No. 2008-244689

SUMMARY

According to an aspect of the present invention, there is provided A path-continuity check method including transmitting a check frame by a node device on an upstream side and receiving the check frame by a node device on a downstream side, the node device on the upstream side and the node device on the downstream side acting as respective end points of a path to check continuity of the path; registering, by the node device on the upstream side, path information of the check frame and a transmission port in a transmission learning table together with a downstream learning number that is a table number of a reception learning table of the node device on the downstream side in which the path information is registered; and setting, by the node device on the upstream side, plural of the downstream learning numbers registered in the transmission learning table in one aggregation check frame as table number ON information items and transmitting, by the node device on the upstream side, the one aggregation check frame to the node device on the downstream side.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

DESCRIPTION OF EMBODIMENTS

Unlike SONET/SDH, Ethernet (Registered Trademark, hereinafter referred to as a "LAN") is a technology that does not always transmit a main signal on a line. Therefore, the absence of a reception frame at the endpoint of a network does not directly represent failure in a relay line.

Thus, in order to detect failure in the relay line, the "wide-area LAN service" of a network carrier intermittently transmits maintenance frames from one end point to another end point of an ESP (Ethernet Switched Path) having a redundant configuration.

In recent years and continuing to the present, a method for exchanging maintenance information within a network using EtherOAM (Operation, Administration and Maintenance) frames having a unique frame configuration has been standardized for the purpose of enhancing maintainability and operability in the "wide-area LAN service" (ITU-T recommendation Y.1731, etc.).

Figure 1:
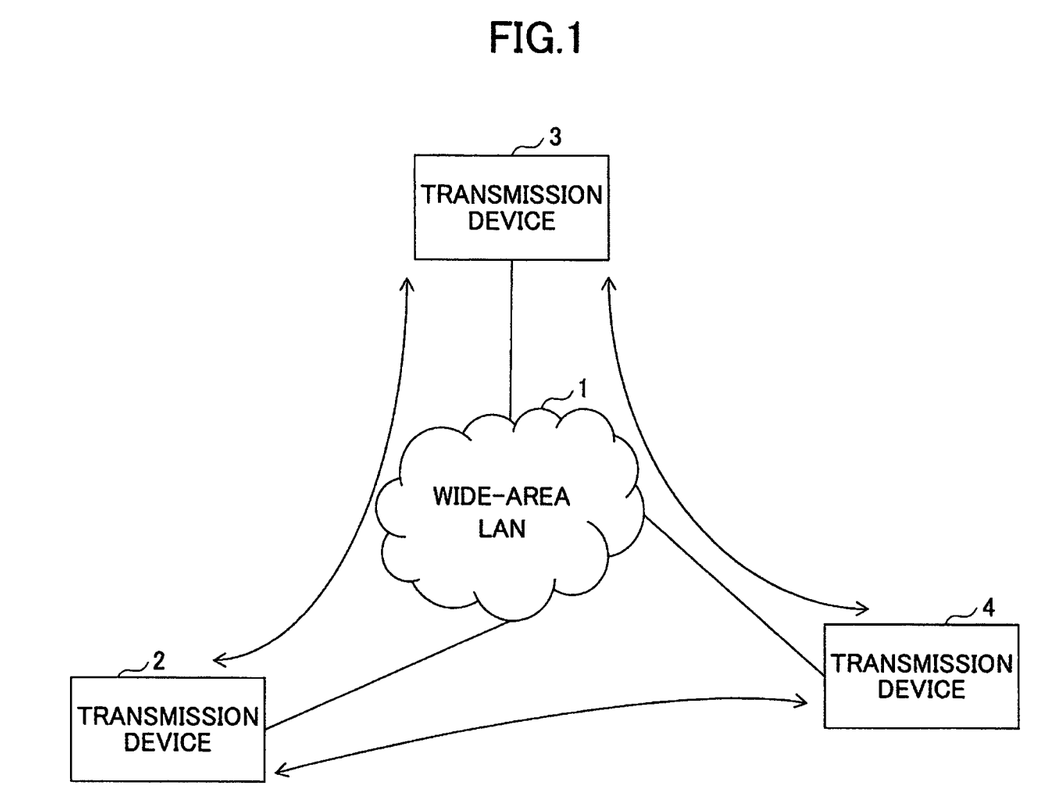
FIG. 1 illustrates the configuration diagram of an example of a wide-area LAN service.

FIG. 1 illustrates the configuration diagram of an example of the wide-area LAN service. In FIG. 1, a wide-area LAN 1 is connected to transmission devices 2, 3, and 4. Each of the transmission devices 2, 3, and 4 serves as an end point that ends the ESP set inside the wide-area LAN 1.

The transmission devices 2, 3, and 4 serving as the end points that end the ESP determine that the ESP is normal if the maintenance frames described above are periodically received, or determine that the ESP is abnormal if the maintenance frames are not received within a certain period of time. This makes it possible to perform a maintenance operation that detects failure in a LAN line and switches the ESP in which the failure occurs to a normal preparatory ESP. The maintenance frames described above are referred to as CCM (Continuity Check Message) frames.

Figure 2:
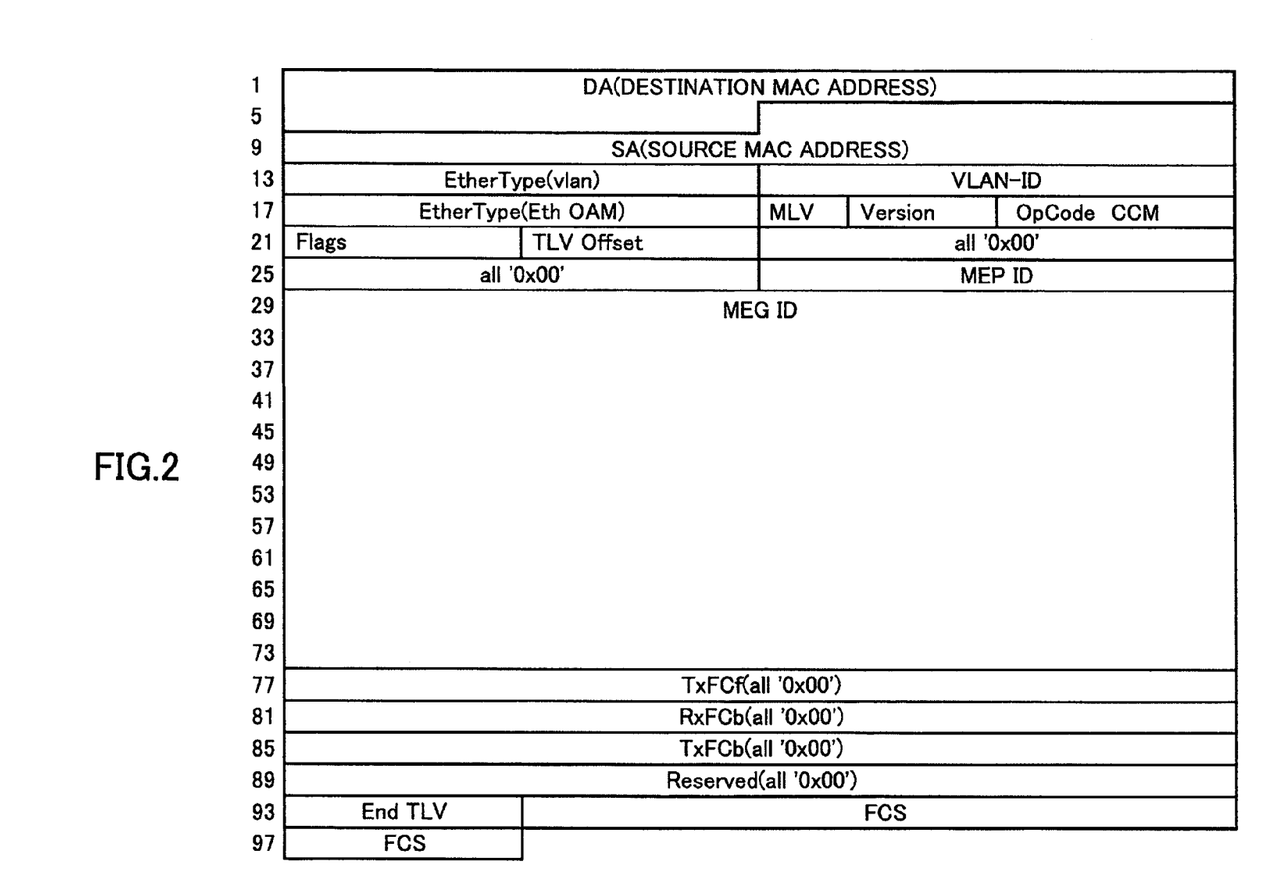
FIG. 2 illustrates the format of a CCM frame.

FIG. 2 illustrates the format of the CCM frame. The CCM frame has a destination MAC address (DA), source MAC address (SA), Ether type (VLAN), VLAN-ID, Ether type (EtherOAM), MLV (Maintenance entity group Level), version, operation code (CCM), flags, TVL offset, MEP-ID (Maintenance entity group End Point-IDentifier), MEG-ID (Maintenance Entity Group-IDentifier), TxFCf, RxFCb, TxFCb, Reserved, end TLV, and FCS (Flame Check Sequence), and is made up of 97 bytes.

Here, the MEP represents a management point that generates and ends an OAM frame, and the MEP-ID represents a node device that ends the CCM frame. The MEG represents a group managed by the EtherOAM. The MLV represents a management level using a value in the range of zero through seven, removes the CCM frame having a MLV value smaller than the MLV previously set in the node device, and transmits and transfers the CCM frame having a large MLV value.

Meanwhile, for generating the topology of a network in which plural nodes are connected to each other by a LAN, there has been known a technology in which a network management system collects a reception result, VLAN information, and MAC information according to Continuity Checks executed by the respective nodes and generates the topology (see, e.g., Patent Document 1).

The CCM frame serving as a trigger for checking continuity, detecting failure, and switching lines between LAN ports is used for various purposes including lot of maintenances as described above. However, the CCM frame particularly used as the trigger for switching lines has a small transmission interval of 3.3 ms for implementing high-speed switching, and a band of about 274 kbps is consumed only for accommodating the CCM frames of one ESP.

In PBB-TE (Provider Backbone Bridge-Traffic Engineering) that is a technology for implementing the wide-area LAN service, the ESP is set for each line (one line for each connection between edge nodes). Therefore, the larger the scale of a network becomes, the more the transmission amount of the CCM frames between respective node devices increases. In a relay network between carriers to which the PBB-TE technology is applied, the total number of the ESPs increases, which results in the total number of the CCM frames transmitted between respective relay nodes being enormous (about 274 Mbps for 1000 ESPs).

In a relay service, it is important to multiplex and accommodate lots of users (services) in one physical line. However, according to a present method, a management band used by the CCM frame also increases as the accommodation of the users (services) increases, which in turn degrades the use efficiency of a relay band.

A path-continuity check method disclosed herein may have an object of enhancing the use efficiency of a relay band between node devices.

Next, an embodiment of the present invention is described with reference to the accompanying drawings.

(Configuration of Node Device)

Figure 3:
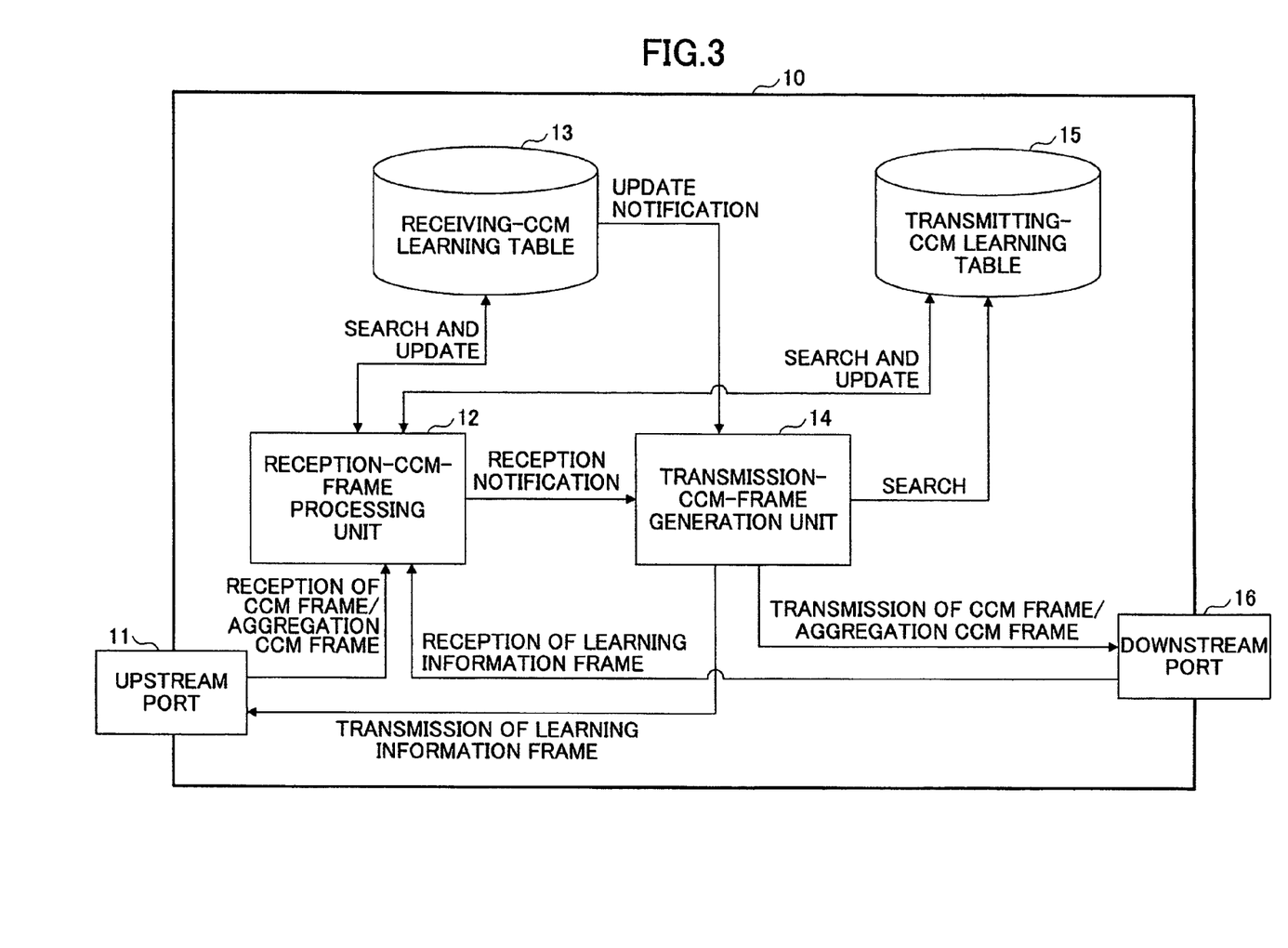
FIG. 3 illustrates the configuration diagram of an embodiment of a node device.

FIG. 3 illustrates the configuration diagram of an embodiment of a node device. In FIG. 3, a transmission device 10 has an upstream port 11, a reception-CCM-frame processing unit 12, a reception-CCM learning table 13, a transmission-CCM-frame generation unit 14, a transmission-CCM learning table 15, and a downstream port 16. Note that plural of the upstream ports 11 and the downstream ports 16 are provided, but FIG. 3 illustrates only one of each of them.

The upstream port 11 receives a CCM frame or an aggregation CCM frame supplied from a node device on an upstream side, and then supplies the received CCM frame or the aggregation CCM frame to the reception-CCM-frame processing unit 12. Further, the upstream port 11 transmits a learning information frame supplied from the transmission-CCM-frame generation unit 14 to the node device on the upstream side.

The reception-CCM-frame processing unit 12 searches for and updates the reception-CCM learning table 13 with information on the CCM frame and a port ID supplied from the upstream port 11, and searches for and updates the transmission-CCM learning table 15 with information on the CCM frame or the aggregation CCM frame supplied from the upstream port 11. Further, the reception-CCM-frame processing unit 12 searches for and updates the transmission-CCM learning table 15 with information on the learning information frame and a port ID supplied from the downstream port 16. Note here that the updating process includes a registration process. Further, upon receiving the CCM frame or the aggregation CCM frame, the reception-CCM-frame processing unit 12 notifies the transmission-CCM-frame generation unit 14 of the fact.

When being updated by the reception-CCM-frame processing unit 12, the reception-CCM learning table 13 notifies the transmission-CCM-frame generation unit 14 of the fact (including the CCM frame).

The transmission-CCM-frame generation unit 14 generates the learning information frame based on the CCM frame included in the update notification from the reception-CCM learning table 13, and transmits the generated learning information frame from the reception port of the CCM frame out of the upstream ports 11. Further, the transmission-CCM-frame generation unit 14 generates the CCM frame or the aggregation CCM frame by searching the transmission-CCM learning table 15 based on the reception notification from the reception-CCM-frame processing unit 12, and transmits the generated CCM frame or the aggregation CCM frame from the downstream port 16.

(Configurations of Reception-CCM Learning Table and Transmission-CCM Learning Table)

Figure 4:
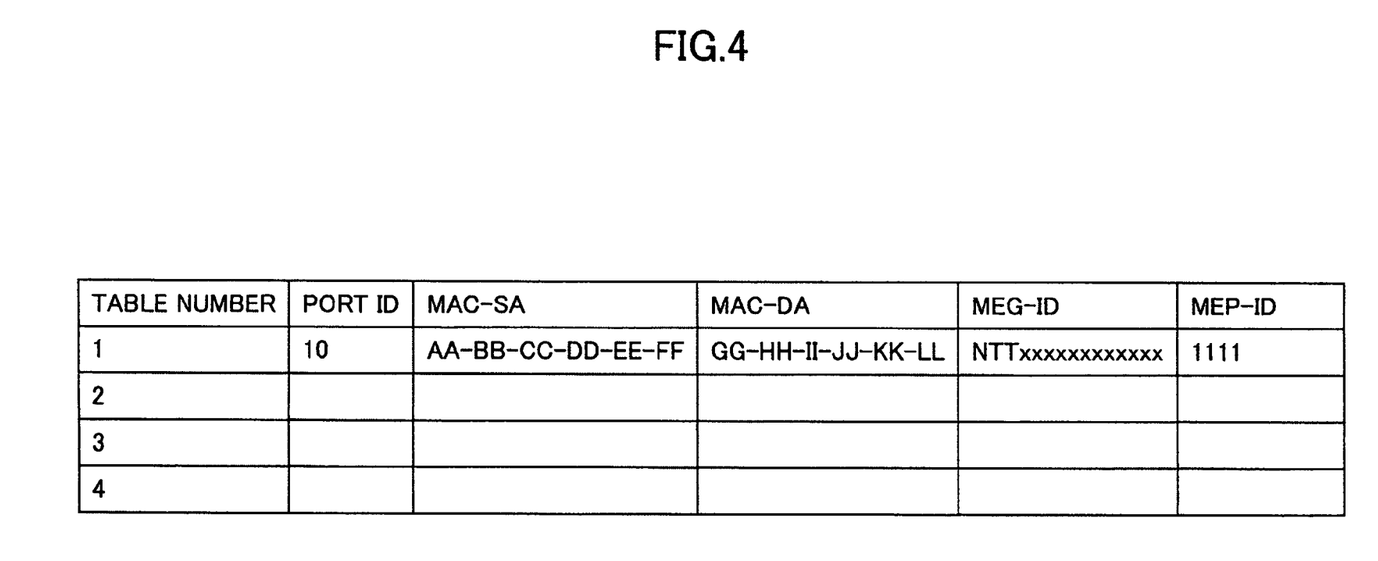
FIG. 4 illustrates the configuration of a reception-CCM learning table.

As illustrated in FIG. 4, the reception-CCM learning table 13 includes a port ID, MAC-SA, MAC-DA, MEG-ID, and MEP-ID for each table number as an entry. In the port ID is registered the port ID of the upstream port 11 that receives the CCM frame. In the MAC-SA, MAC-DA, MEG-ID, and MEP-ID are registered a source MAC address, destination MAC address, MEG-ID, and MEP-ID, respectively, from the received CCM frame.

Note that the ESP is specified by the MAC-SA, MAC-DA, MEG-ID, and MEP-ID. In each entry of the reception-CCM learning table 13 is registered the MAC-SA, MAC-DA, MEG-ID, and MEP-ID for specifying the ESP. The same applies to the transmission-CCM learning table 15.

Figure 5:
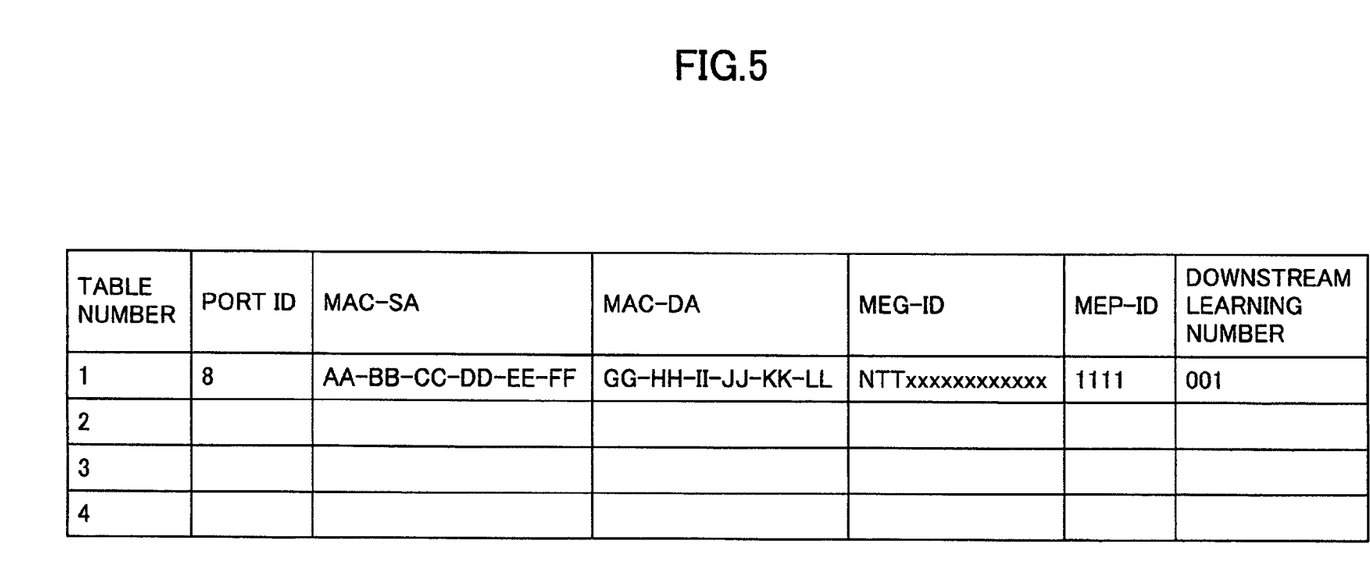
FIG. 5 illustrates the configuration of a transmission-CCM learning table.

As illustrated in FIG. 5, the transmission-CCM learning table 15 includes a port ID, MAC-SA, MAC-DA, MEG-ID, MEP-ID, and downstream learning number for each table number as an entry. In the port ID is registered the port ID of the downstream port 16 that transmits the CCM frame or the aggregation CCM frame. In the MAC-SA, MAC-DA, MEG-ID, and MEP-ID are registered a source MAC address, destination MAC address, MEG-ID, and MEP-ID, respectively, from the received CCM frame. In the downstream learning number is registered the table number of the reception-CCM learning table 13 in a node device on the downstream side notified from the node device on the downstream side by the learning information frame.

(Formats of Learning Information Frame and Aggregation CCM Frame)

Figure 6:
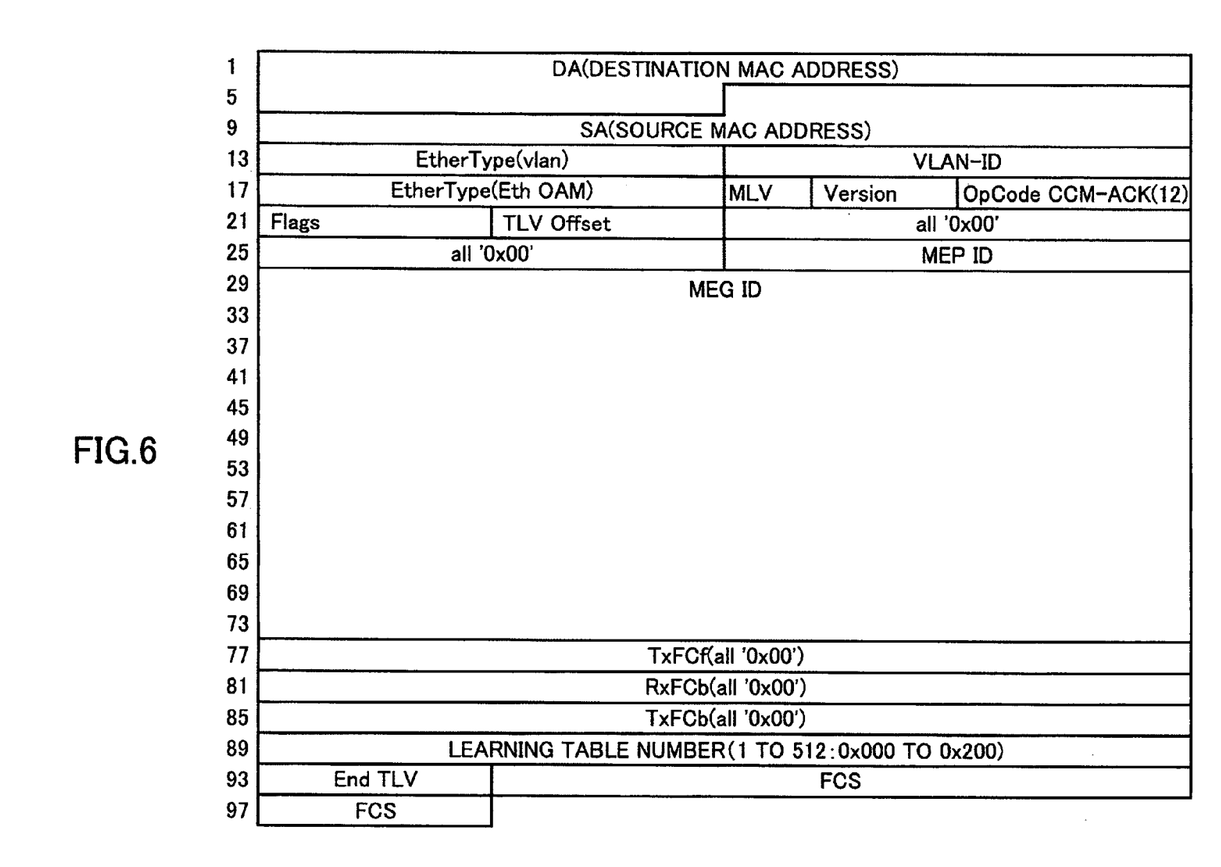
FIG. 6 illustrates the format of a learning information frame.

FIG. 6 illustrates the format of the learning information frame. The format of the learning information frame is obtained by replacing the Reserved of the format of the CCM frame with a learning table number. In other words, the learning information frame has a destination MAC address (DA), source MAC address (SA), Ether type (VLAN), VLAN-ID, Ether type (EtherOAM), MLV, version, operation code (CCM-ACK), flags, TVL offset, MEP-ID, MEG-ID, TxFCf, RxFCb, TxFCb, learning table number, end TLV, and FCS, and is made up of 97 bytes. In the learning table number, a number in the range of 1 through 512 is shown by 0x000 through 0x200 (0x represents a hexadecimal number), and a table number in the reception-CCM learning table 13 is set.

Figure 7:
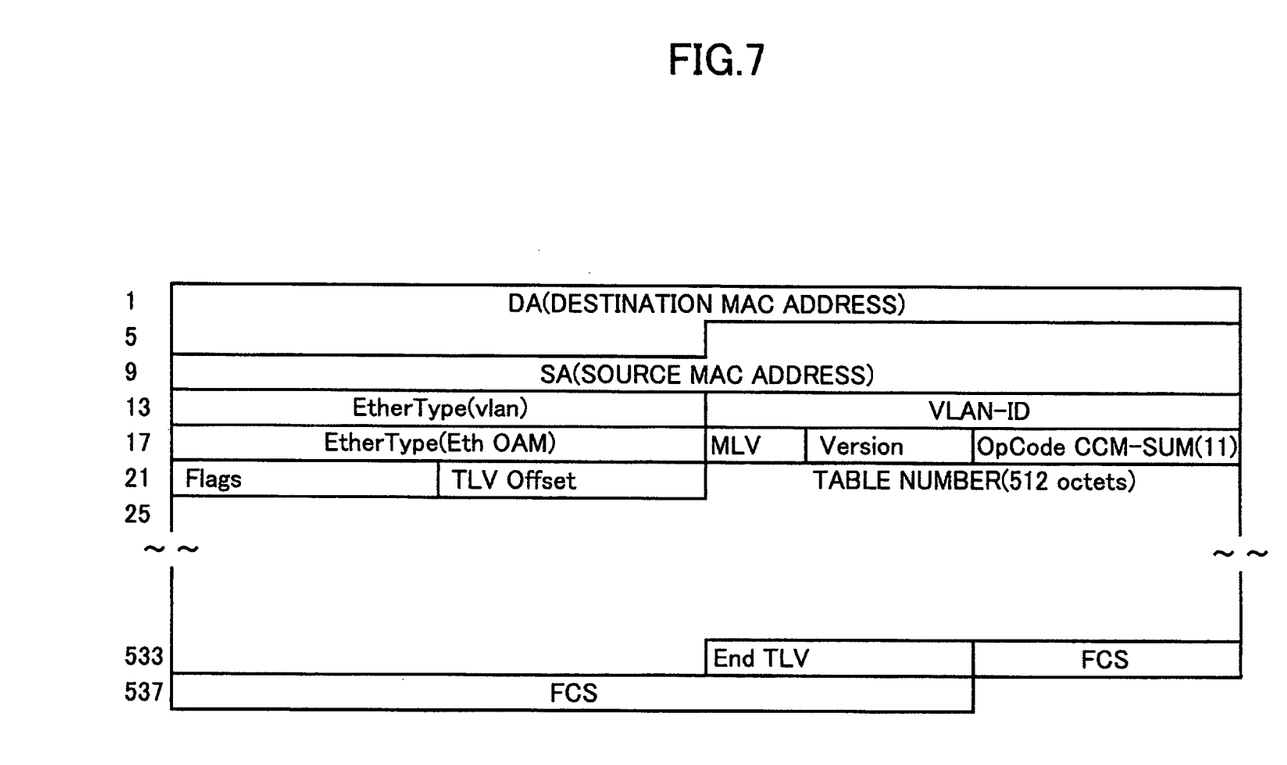
FIG. 7 illustrates the format of an aggregation CCM frame.

FIG. 7 illustrates the format of the aggregation CCM frame. The aggregation CCM frame has a destination MAC address (DA), source MAC address (SA), Ether type (VLAN), VLAN-ID, Ether type (EtherOAM), MLV (Maintenance entity group LeVel), version, operation code (CCM-SUM), flags, TVL offset, table number area of 512 octets, end TLV, and FCS, and is made up of 539 bytes.

In the table number area, the bits respectively correspond to table numbers 1, 2, . . . 4096 of the learning table numbers in the order from the leading bit. In each bit, "1" represents table number ON information, and "0" represents table number OFF information. In other words, it is possible to inform the ON/OFF of the table numbers up to 4096 with the 512 octets. This is because it is set to be equal to an identifiable number with a VLAN tag.

(OAM-Frame Reception Processing)

Figure 8:
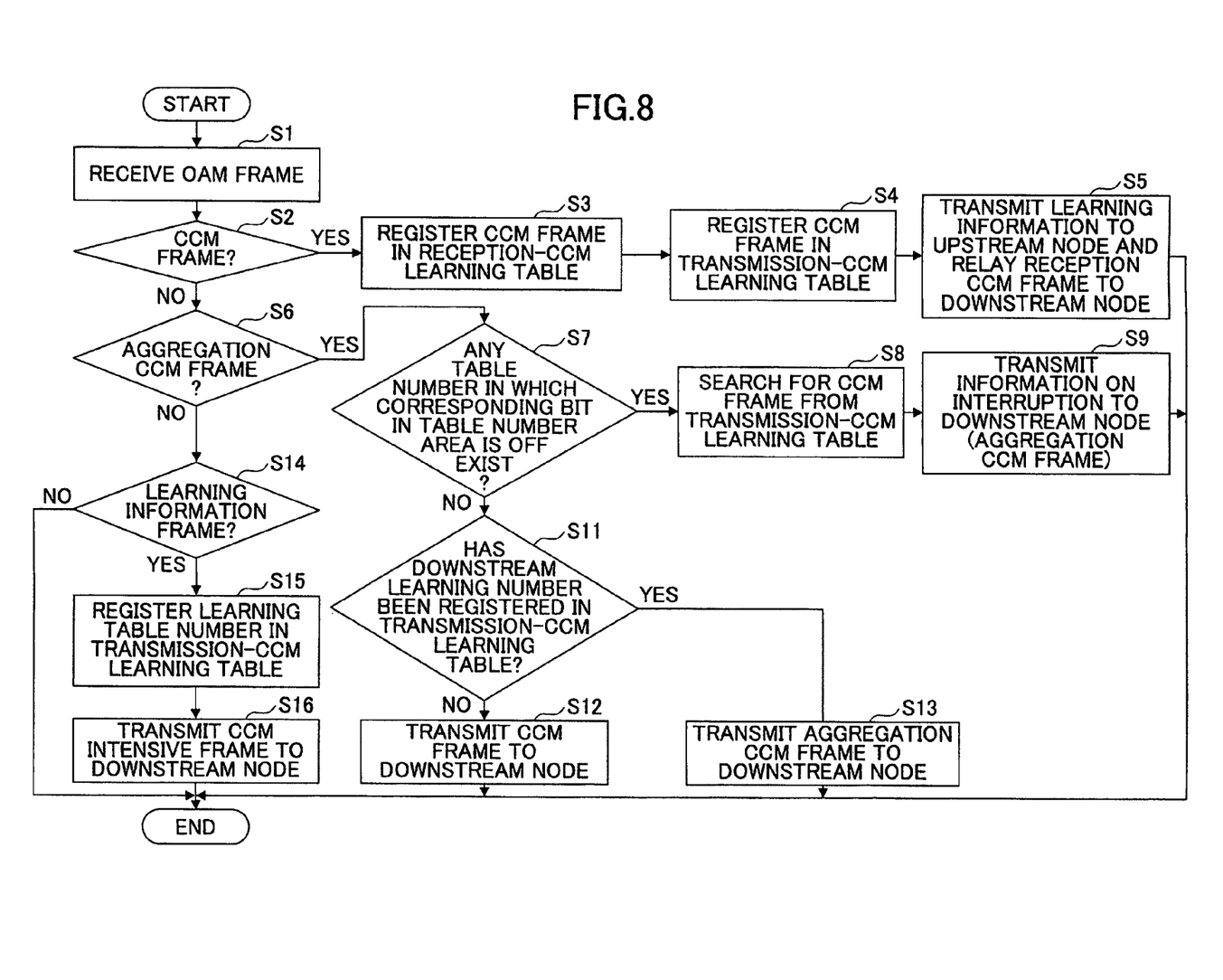
FIG. 8 is a flowchart for illustrating an embodiment of OAM-frame reception processing.

FIG. 8 is a flowchart for illustrating an embodiment of OAM-frame reception processing executed by the node device. As illustrated in FIG. 8, in step S1, the node device receives the OAM frame at the upstream port 11 or the downstream port 16. In step S2, the reception-CCM-frame processing unit 12 determines whether the received OAM frame is the CCM frame.

If the received OAM frame is the CCM frame, the reception-CCM-frame processing unit 12 registers the received CCM frame in the reception-CCM learning table 13 in step S3. In other words, the reception-CCM-frame processing unit 12 registers the port ID of the upstream port 11 that has received the CCM frame in the port ID of the entry of an unregistered table number, and registers the source MAC address, destination MAC address, MEG-ID, and MEP-ID of the received CCM frame in the MAC-SA, MAC-DA, MEG-ID, MEP-ID of the entry, respectively.

Then, in step S4, the reception-CCM-frame processing unit 12 registers the received CCM frame in the transmission-CCM learning table 15. In other words, the reception-CCM-frame processing unit 12 registers the port ID of the downstream port 16 that will transmit the CCM frame (or the aggregation CCM frame) in the port ID of the entry of an unregistered table number, and registers the source MAC address, destination MAC address, MEG-ID, and MEP-ID of the received CCM frame in the MAC-SA, MAC-DA, MEG-ID, and MEP-ID, respectively.

Next, in step S5, the transmission-CCM-frame generation unit 14 generates the learning information frame responsive to an adjacent node device on the upstream side that has transmitted the CCM frame, and transmits the generated learning information frame from the upstream port 11. In addition, the transmission-CCM-frame generation unit 14 relays (transfers) the received CCM frame to a node device on the downstream side. At this time, the table number of the reception-CCM learning table 13 that has registered the CCM frame is set in the learning table number of the learning information frame. After executing step S5, the node device completes the processing.

On the other hand, if the OAM frame received in step S2 is not the CCM frame, the reception-CCM-frame processing unit 12 determines whether the received OAM frame is the aggregation CCM frame in step S6. If the received OAM frame is the aggregation CCM frame, the reception-CCM-frame processing unit 12 determines in step S7 whether there is any table number in which a corresponding bit in the table number area of the 512 octets of the received aggregation CCM frame is OFF (="0") with respect to the table numbers having the same reception port as the aggregation CCM frame among those registered in the reception-CCM learning table 13. Here, the existence of the table number in which the corresponding bit in the table number area is OFF represents that the CCM frame corresponding to the table number has been interrupted (not arrived).

If the table number in which the corresponding bit in the table number area is OFF exists, the reception-CCM-frame processing unit 12 reads the MAC-SA, MAC-DA, MEG-ID, MEP-ID from the reception-CCM learning table 13 with respect to the table number in which the corresponding bit is OFF, and searches the transmission-CCM learning table 15 using the read MAC-SA, MAC-DA, MEG-ID, and MEP-ID to obtain a port ID (output port). The reception-CCM-frame processing unit 12 notifies the transmission-CCM-frame generation unit 14 of the port ID together with the MAC-SA, MAC-DA, MEG-ID, and MEP-ID.

Then, in step S9, the transmission-CCM-frame generation unit 14 generates the aggregation CCM frame using the MAC-SA, MAC-DA, MEG-ID, and MEP-ID. At this time, the transmission-CCM-frame generation unit 14 sets to be OFF (="0": interrupted information) the bit corresponding to the downstream learning number of the entry (table number) determined in the search of the transmission-CCM learning table 15 in the table number area of the 512 octets of the aggregation CCM frame. After that, the transmission-CCM-frame generation unit 14 transmits the generated aggregation CCM frame from the downstream port specified by the port ID of the entry obtained by searching the transmission-CCM learning table 15. After executing step S9, the node device completes the processing.

If the table number in which the corresponding bit in the table number area is OFF does not exist in step S7, the transmission-CCM-frame generation unit 14 determines whether the downstream learning numbers of all the table numbers of the transmission-CCM learning table 15 have been registered, i.e., learned.

With respect to the entries of table numbers in which the downstream learning numbers have not been registered, the transmission-CCM-frame generation unit 14 generates the normal CCM frame using the MAC-SA, MAC-DA, MEG-ID, and MEP-ID of the entry and transmits the generated CCM frame from the downstream port specified by the port ID of the entry in step S12. After executing step S12, the node device completes the processing.

Further, with respect to the entries of the table numbers in which the downstream learning numbers have been registered, the transmission-CCM-frame generation unit 14 aggregates the entries of the table numbers having the same port number in the transmission-CCM learning table 15 to generate one aggregation CCM frame. In other words, the transmission-CCM-frame generation unit 14 reads the downstream learning number registered in each entry of the table number having the same port ID, and sets to be ON (="1") the bit in the table number area of the aggregation CCM frame corresponding to the read downstream learning number. Then, the transmission-CCM-frame generation unit 14 transmits the generated aggregation CCM frame from the downstream port specified by the corresponding port ID. After executing step S13, the node device completes the processing.

Moreover, if the OAM frame is not the aggregation CCM frame in step S6, the reception-CCM-frame processing unit 12 determines whether the received OAM frame is the learning information frame in step S14. If the received OAM frame is the learning information frame, the reception-CCM-frame processing unit 12 takes out the learning table number of the received learning information frame in step S15, and registers the taken-out learning table number in the downstream learning number of the entry of the transmission-CCM-learning table 15 in which the DA, SA, MEP-ID, and MEG-ID of the learning information frame correspond to the MAC-SA, MAC-DA, MEG-ID, and MEP-ID, respectively.

Next, in step S16, the transmission-CCM-frame generation unit 14 generates the aggregation CCM frame in which the bit in the table number area corresponding to the learning table number reported by the learning information frame is set to be ON (="0"), and transmits the generated aggregation CCM frame from the downstream port specified by the port ID of the transmission-CCM learning table 15. After executing step S16, the node device completes the processing. Note that if the OAM frame is not the learning information frame in step S14, the node device completes the processing.

(Interrupted-CCM Detection Processing)

Figure 9:
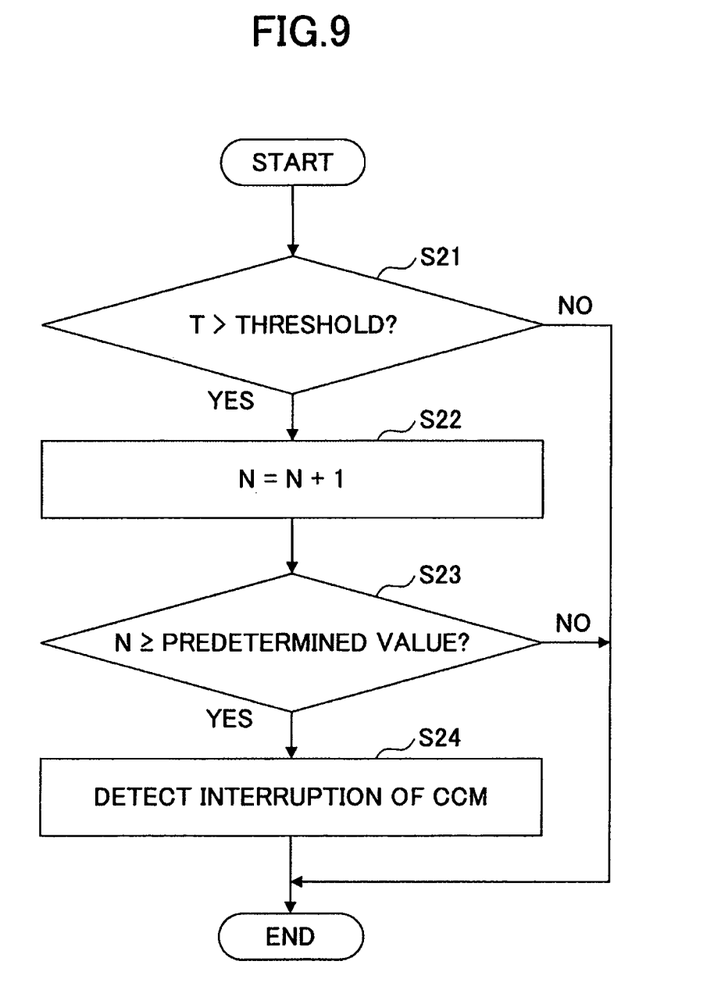
FIG. 9 is a flowchart for illustrating an embodiment of interrupted-CCM detection processing.

FIG. 9 is a flowchart for illustrating an embodiment of interrupted-CCM detection processing executed by the node device. This processing is executed by the reception-CCM-frame processing unit 12 every predetermined time for the CCM of each entry (table number) registered in the reception-CCM learning table 13. Note that a timer T is set for each entry of the reception-CCM learning table 12, reset to zero when the CCM frame (or the aggregation CCM frame) of each entry is received, and then counts a clock. Further, a number N is reset to zero when the entry of the CCM is registered in the reception-CCM learning table 12.

As illustrated in FIG. 9, in step S21, a determination is made as to whether the count value of the timer T exceeds a threshold. For example, a value greater than 3.3 ms is set in the threshold. If the count value of the timer T exceeds the threshold, the number N is incremented by one in step S22. Then, a determination is made as to whether the number N is greater than or equal to a predetermined value (e.g., three) in step S23.

If the number N is greater than or equal to the predetermined value, it is detected that the CCM frame (or the aggregation CCM frame) has been interrupted (not arrived) in step S24 and the aggregation CCM frame in which the corresponding bit in the table number area is set to be OFF (interrupted information) is transmitted to the node device on the downstream side as in step S9 of FIG. 8. Note that if no downstream learning numbers have been registered in the transmission-CCM learning table, the transmission of the CCM frame is stopped. Further, the node device notifies a higher-order device such as a monitor device of a check result, and completes the processing.

(Configuration of ESP)

Figure 10:
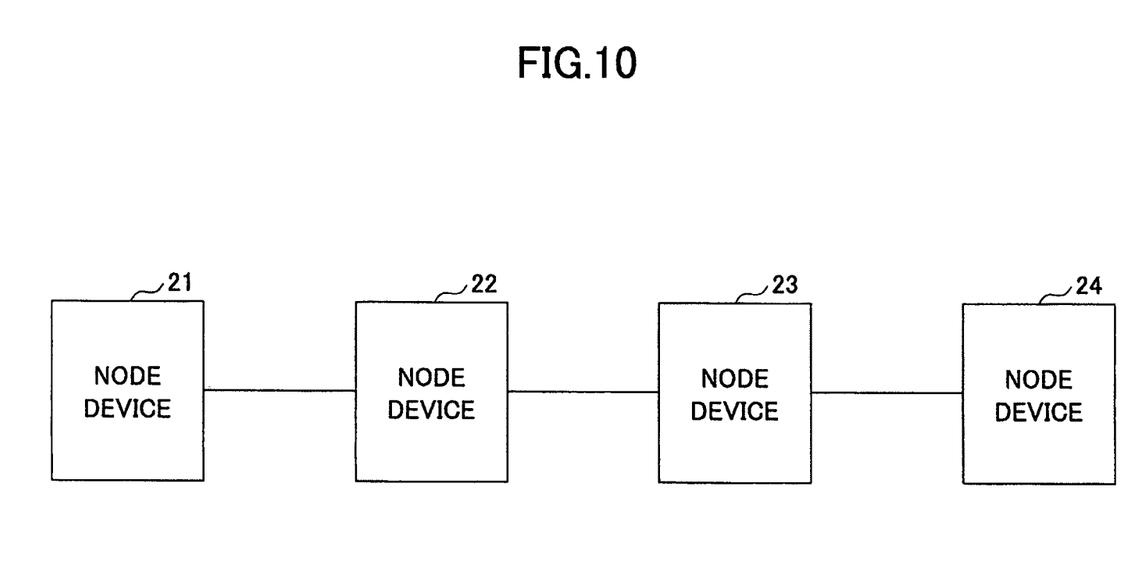
FIG. 10 illustrates the configuration diagram of an embodiment of an ESP.

FIG. 10 illustrates the configuration diagram of an embodiment of the ESP. As illustrated in FIG. 10, the ESP is composed of the node devices 21, 22, 23, and 24, and directed from the node device 21 to the node device 24.

First, when the ESP is set, the node devices learn adjacent node information using a link trace function or the like. Note that the link trace function is a function in which, for example, the node device 21 transmits a link trace frame to the node device 24 and then the node devices 22, 23, and 24 having received the link trace frame transmit link trace response frames to the node device 21 as an origin to obtain the adjacent node information.

After that, the node device 21 as one end point of the ESP starts transmitting the CCM frame to the node device 24 as another end point of the ESP.

Upon receiving the CCM frame from the node device 21, the node device 22 registers the learning information such as the reception port of the CCM frame, the DA, SA, MEP-ID, and MEG-ID of the CCM frame accompanied by the table number in the reception-CCM learning table 13, and registers the learning information accompanied by the table number in the transmission-CCM learning table 15. Moreover, the node device 21 generates the learning information frame in which the learning information is set in the DA, SA, MEP-ID, and MEG-ID and the table number registered in the reception-CCM learning table 13 is set in the learning table number, and returns the generated learning information frame to the node device 21.

The node device 21 having received the learning information frame searches the transmission-CCM learning table 15 by using the learning information of the learning information frame, and registers and learns the learning table number of the received learning information frame in the downstream learning number of the entry of the searched table number.

Further, the node device 21 generates the aggregation CCM frame in which the bit in the table number area corresponding to the learning table number reported by the learning information frame is set to be ON (="1"), and then transmits the generated aggregation CCM frame to the node device 22. For example, the node device having been notified of the learning table number "1" by the node device on the downstream side using the learning information frame transmits the aggregation CCM frame, in which the first bit in the table number area representing the table number "1" is set to be ON, to the node device on the downstream side.

Similarly, the node device 23 having received the CCM frame transmitted from the node device 21 via the node device 22 generates the learning information frame, in which the table number of the reception-CCM learning table 13 is set in the learning table number, and then returns the generated learning information frame to the adjacent node device 22. After that, the node device 22 having received the learning information frame terminates the CCM frame from the node device 21, and then transmits the aggregation CCM frame to the node device 23.

The CCM frame directed to the node device 24 are also relayed from the node device 22 to the node device 23. Similar to the case of receiving the CCM frame from the node device 21, the node device 22 learns the table number of the reception-CCM learning table 12 as a destination by the learning information frame received from the node device 23 (registers the table number in the downstream learning number of the transmission-CCM learning table 15) at the time of transmitting the CCM frame to the node device 23.

Further, when the interruption (nonarrival) of a specific CCM frame is detected in the node device on the upstream side, the node device on the upstream side transmits the aggregation CCM frame, in which the bit in the table number area is set to be OFF (="0"), to the node device on the downstream side. Thus, it is possible to transmit the interruption (nonarrival), i.e., LOC (Loss Of Continuity) of the specific CCM frame from the node device on the upstream side to the node device on the downstream side.

For example, when the interruption of the CCM frames with respect to the table number (=1) of the reception-CCM learning table 13 is detected in the node device 21, the node device 21 searches for the table number having the same MAC-SA, MAC-DA, MEG-ID, and MEP-ID as the CCM frame detected to be interrupted from the transmission-CCM learning table 15, and transmits the aggregation CCM frame in which the bit in the table number area corresponding to the downstream learning numbers of the entry of the table number is set to be OFF (="0"). Thus, it is possible to report information on the interruption of the CCM frame from the node device 21 to the node device 22. Similarly, the same information on the interruption of the CCM frame is transferred from the node device 22 to the node device 23.

Meanwhile, let it be assumed that a conventional node device which does not have the aggregation CCM function described above is provided on the upstream side of a self node device having the aggregation CCM function. Even if the self node device receives the CCM frame and reports the learning information frame to the node device on the upstream side, the node device on the upstream side does not transmit the aggregation CCM frame to the self node device but continues to exchange the CCM frame as usual.

Further, even if a transmission device which does not have the aggregation CCM function is provided on the downstream side of the self node device, the transmission device on the downstream side does not report the learning information frame in response to the CCM frame transmitted from the self node device. Therefore, the self node device does not transmit the aggregation CCM frame to the node device on the downstream side but continues to exchange the CCM frame as usual, which results in no adverse effects or restrictions.

According to the embodiment described above, the CCM frames relayed between the node devices are aggregated into one aggregation CCM frame. Thus, the use band of the aggregation CCM frames becomes generally constant regardless of the number of the ESPs between the node devices, thereby making it possible to more effectively use the band between the node devices. Further, with the expansion of the table number areas of the CCM learning tables 13, 15, and the aggregation CCM frames, it is possible to increase the number of the ESPs accommodated in the network without hardly affecting the relay band. Further, even if a node device which does not support the aggregation CCM function is provided in the network, it is possible to check the continuity of a path.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. A path-continuity check method comprising:
   transmitting a check frame by a node device on an upstream side and receiving the check frame by a node device on a downstream side, the node device on the upstream side and the node device on the downstream side acting as respective end points of a path to check continuity of the path;
   registering, by the node device on the upstream side, path information of the check frame and a transmission port in a transmission learning table together with a downstream learning number that is a table number of a reception learning table of the node device on the downstream side in which the path information is registered; and
   setting, by the node device on the upstream side, plural of the downstream learning numbers registered in the transmission learning table in one aggregation check frame as table number ON information items and transmitting, by the node device on the upstream side, the one aggregation check frame to the node device on the downstream side.

2. A path-continuity check method comprising:
   transmitting a check frame by a node device on an upstream side and receiving the check frame by a node device on a downstream side, the node device on the upstream side and the node device on the downstream side acting as respective end points of a path to check continuity of the path;
   registering, by the node device on the upstream side, path information of the check frame to be transmitted to the node device on the downstream side in a transmission learning table together with a transmission port;
   registering, by the node device on the downstream side, the path information of the check frame received from the node device on the upstream side in a reception learning table together with a reception port;
   notifying, by the node device on the downstream side, the node device on the upstream side of a table number of the reception learning table in which the path information is registered;
   registering, by the node device on the upstream side, the table number of the reception learning table reported by the node device on the downstream side in the transmission learning table as a downstream learning number; and
   setting, by the node device on the upstream side, plural of the downstream learning numbers registered in the transmission learning table in one aggregation check frame as table number ON information items and transmitting, by the node device on the upstream side, the one aggregation check frame to the node device on the downstream side.

3. The path-continuity check method according to claim 2, further comprising:
   registering, by the node device on the upstream, side, path information of a check frame received from a node device on a further upstream side in the transmission learning table as the path information of the check frame to be transmitted to the node device on the downstream side together with the transmission port.

4. The path-continuity check method according to claim 3, further comprising:
   setting, by the node device on the upstream side, table number OFF information of the check frame in the aggregation check frame and transmitting, by the node device on the upstream side, the aggregation check frame to the node device on the downstream side when nonarrival of the check frame is detected by the node device on the upstream side.

5. The path-continuity check method according to claim 4, further comprising:
   setting, by the node device on the downstream side, the table number OFF information in the aggregation check frame and transmitting, by the node device on the downstream side, the aggregation check frame to a node device on a further downstream side when the table number OFF information of the aggregation check frame is detected by the node device on the downstream side.

6. The path-continuity check method according to additional claim 5, further comprising:
   transmitting, by the node device on the upstream side, the check frame to the node device on the downstream side when the downstream learning numbers are not registered in the transmission learning table.

7. A node device acting as a node device on an upstream side and as an end point of a path, continuity of the path being to be checked, the node device comprising:
   a transmission learning table registration unit that registers path information of a check frame to be transmitted to a node device on a downstream side in a transmission learning table together with a transmission port;
   a transmission unit that transmits the check frame to the node device on the downstream side acting as another end point of the path, the node device on the downstream side registering the path information of the check frame received from the node device on the upstream side in a reception learning table together with the transmission port and notifying the node device on the upstream side of a table number of the reception learning table in which the path information is registered;
   a downstream learning number registration unit that registers the table number of the reception learning table reported by the node device on the downstream side in the transmission learning table of the node device on the upstream side as a downstream learning number; and an aggregation check frame transmission unit that sets plural of the downstream learning numbers registered in the transmission learning table in one aggregation check frame as table number ON information items and transmits the one aggregation check frame to the node device on the downstream side.

8. The node device according to claim 7, wherein the transmission learning table registration unit registers path information of a check frame received from a node device on a further upstream side in the transmission learning table as the path information of the check frame to be transmitted to the node device on the downstream side together with the transmission port.

9. The node device according to claim 8, further comprising:

a nonarrival detection unit that detects nonarrival of the check frame from the node device on the further upstream side; wherein, when the nonarrival of the check frame is detected by the nonarrival detection unit, the aggregation check frame transmission unit sets table number OFF information of the check frame in the aggregation check frame and transmits the aggregation check frame to the node device on the downstream side.

10. The node device according to claim 9, further comprising:

an OFF information detection unit that detects table number OFF information of the aggregation check frame from the node device on the further upstream side; wherein the aggregation check frame transmission unit sets the detected table number OFF information in the aggregation check frame and transmits the aggregation check frame to the node device on a further downstream side when the table number OFF information is detected by the OFF information detection unit.

11. The node device according to claim 10, further comprising:

a check frame transmission unit that transmits the check frame to the node device on the downstream side when the downstream learning numbers are not registered in the transmission learning table.

* * * * *

UNITED STATES PATENT AND TRADEMARK OFFICE
CERTIFICATE OF CORRECTION

PATENT NO.        : 8,537,691 B2
APPLICATION NO.   : 12/926367
DATED             : September 17, 2013
INVENTOR(S)       : Takanori Sasaki It is certified that error appears in the above-identified patent and that said Letters Patent is hereby corrected as shown below:

In the Claims:

In Col. 10, Line 19, In Claim 3, delete "upstream," and insert -- upstream --, therefor.
In Col. 10, Lines 44-45, In Claim 6, after "to" delete "additional".

Signed and Sealed this
Thirty-first Day of December, 2013

Margaret A. Focarino
*Commissioner for Patents of the United States Patent and Trademark Office*